Oct. 18, 1932.    F. H. KERR    1,883,381
MULCH
Filed June 24, 1929
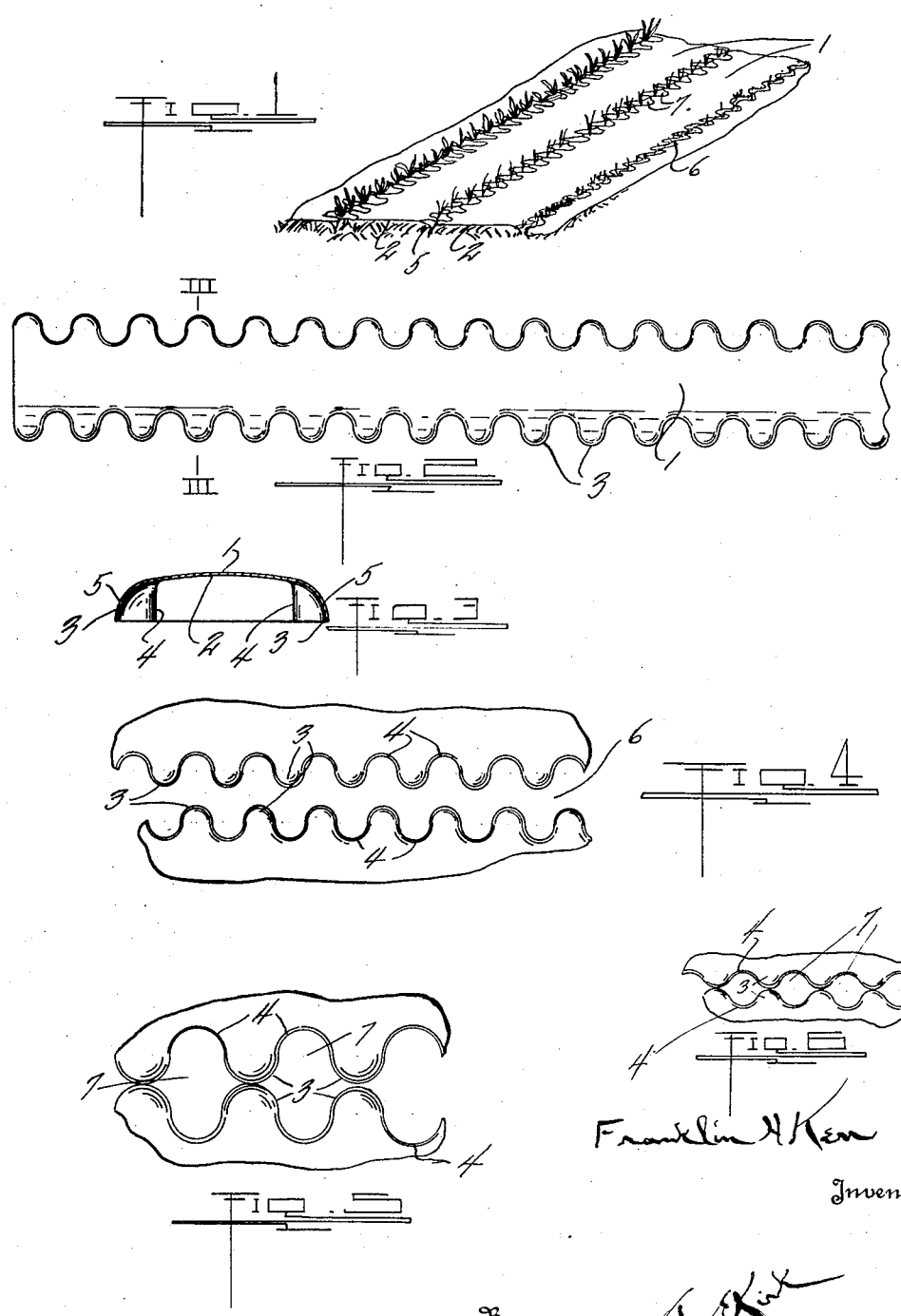
Franklin H Kerr
Inventor
By
Attorney Patented Oct. 18, 1932

1,883,381

UNITED STATES PATENT OFFICE

FRANKLIN H. KERR, OF TOLEDO, OHIO

MULCH

Application filed June 24, 1929. Serial No. 373,100.

This invention relates to gardening.

This invention has utility when incorporated in shields intermediate growing regions for vegetation.

Referring to the drawing:

Fig. 1 is a perspective view of a portion of a gardening plot having an embodiment of the invention incorporated therewith;

Fig. 2 is a plan view of one of the mulch elements or members of Fig. 1;

Fig. 3 is a section on the line III—III, Fig. 2;

Fig. 4 is a fragmentary plan view of the proximate region of a pair of mulch shields for defining a sinuous row, with the irregularities spaced;

Fig. 5 is a view similar to Fig. 4, with the irregularities as projecting in abutting relation, thereby providing spaced clearance regions; and Fig. 6 is a modification of the shields.

Herein there is provided mulch shield having major rigid convex top portion 1. In practice these may be of sheet metal, even of light gage, the narrower the shield the lighter the gage. However, notwithstanding, the device may be plated or coated against corrosion by galvanizing, and additionally there may be enameling or pitch coating, say black, as a heat absorbent. The under or opposed concave central region 2 of the shield is a heat imparting and transmitting medium to the protected soil region below the shield.

This shield in practice according to the character of vegetation being given attention may be narrow say as to two, three or four inches, or up to eighteen or twenty inches as may be desired for width. The wider the sheet the more desirable it is to have a heavier gage. However, in the narrower width, a light gage, even twenty or thinner, may be used, and longitudinal rigidity given by dropping the margins in providing anchoring means.

This marginal flange depending portion has additional attribute when, instead of being straight, there is given to it an irregular or sinuous form, providing projections 3 and re-entrant portions 4 in the depending regions 5. These irregularities 3, 4, in the seating of the pans for uniform spacing, provide sinuous row 6 for receiving a sowed or more or less continuous grouping of vegetation as in the sowing of lettuce, radishes, etc.; while for isolated plants as onion sets, beets, corn, etc., the projections 3 on one shield may abut with projections 3 on the adjacent shield, thereby having a pair of re-entrant or notched portions 4 in opposition to provide clearance region 7 as a spaced series in a row, even for hills and interplanting.

These shields may be readily placed and removed, and are thus adapted for re-use season after season or in various shifted locations in a garden in the care of vegetation. The shields may even be used as a guard against frost or inclement weather by location over the row at the tender interval, while re-shifting may occur to give advantage of the sunlight during the day and the reception of rain. The shield proper as between the regions for vegetation growth directs the precipitation upon the plants as growing, holds the sun's warmth in the soil as transmitted through the shield, and keeps back weeds and other growths so that the crop may have the full advantage of soil strength and the retention of soil warth and moisture. The shields may be of a common length or slight departures therefrom. When in dis-use they may be nested in a stack compactly. When in use they provide a tread region for one giving attention to the crop. The depending flanges are effective to anchor the mulch shield against casual shifting, and thereby insure rigid guard for the rows of vegetation. There is no danger of wind shifting. The drop flange holds the moisture directly to the plants' proximity and against evaporation.

What is claimed and it is desired to secure by Letters Patent is:

1. A mulch shield having an intermediate deck and opposite depending sinuous edges.

2. The combination of a pair of vegetation defining mulch shields having proximate edges depending and sinuous.

3. The combination of a pair of vegetation row defining mulch shields having proximate edges depending and symmetrical for spaced registry in determining therebetween alternately abutting and spaced clearance regions for the row.

4. A metallic mulch shield having a major intermediate deck portion and opposite depending notched soil entering edges extending approximately at right angles to the deck portion for anchoring the shield against shifting with the deck portion under-side approximating engagement with the loose soil.

In witness whereof I affix my signature.

FRANKLIN H. KERR.